United States Patent [19]
Yano et al.

[11] Patent Number: 5,674,643
[45] Date of Patent: Oct. 7, 1997

[54] NON-SINTERED NICKEL ELECTRODE FOR ALKALINE STORAGE CELL

[75] Inventors: Mutsumi Yano, Hirakata; Mitsuzo Nogami, Takatsuki; Reizo Maeda; Mamoru Kimoto, both of Hirakata; Shigekazu Yasuoka, Sumoto; Katsuhiko Shinyama, Sakai; Koji Nishio, Hirakata; Toshihiko Saito, Hyogo, all of Japan

[73] Assignee: Sanyo Electric Co., Ltd., Moriguchi, Japan

[21] Appl. No.: 600,088

[22] Filed: Feb. 12, 1996

[30] Foreign Application Priority Data

Feb. 14, 1995 [JP] Japan .................. 7-025263
Feb. 14, 1995 [JP] Japan .................. 7-025264
Feb. 24, 1995 [JP] Japan .................. 7-037027

[51] Int. Cl.⁶ .................................. H01M 4/52
[52] U.S. Cl. .................................. 429/223
[58] Field of Search ........................ 429/223

[56] References Cited

U.S. PATENT DOCUMENTS 4,546,058 10/1985 Charkey et al. ............ 429/223
4,985,318 1/1991 Oshitani et al. ............ 429/223
5,478,674 12/1995 Miyasaka ................... 429/223 X

FOREIGN PATENT DOCUMENTS 0 523 284 A2 1/1993 European Pat. Off. .
0 552 790 A1 7/1993 European Pat. Off. .
0 633 233 A1 1/1995 European Pat. Off. .
0 650 207 A1 4/1995 European Pat. Off. .
5-21064 1/1993 Japan .
5-28992 2/1993 Japan .
5-41212 2/1993 Japan .
6-150925 5/1994 Japan .
WO 94/19939 9/1994 WIPO .

*Primary Examiner*—Stephen Kalafut
*Attorney, Agent, or Firm*—Armstrong, Westerman, Hattori, McLeland & Naughton

[57] ABSTRACT

A non-sintered nickel electrode for use in alkaline storage cells includes an active material comprising a solid solution of nickel hydroxide mixed with manganese, the solid solution further incorporating one or more elements selected from a group consisting of cobalt, cadmium, calcium and magnesium; an active material comprising a solid solution of nickel hydroxide mixed with manganese and zinc, the solid solution further incorporating one or more elements selected from a group consisting of cobalt, cadmium, calcium and magnesium; or an active material comprising nickel hydroxide with manganese added thereto, some of which manganese is incorporated in a solid solution of nickel hydroxide and the rest of which manganese exists as liberated from the solid solution of nickel hydroxide.

10 Claims, 10 Drawing Sheets

NON-SINTERED NICKEL ELECTRODE FOR ALKALINE STORAGE CELL

BACKGROUND OF THE INVENTION

1. Field of the Invention

The present invention relates to a non-sintered nickel electrode for use as the positive electrode of alkaline storage cells such as nickel-hydrogen storage cells and nickel-cadmium storage cells.

2. Description of the Prior Art

A sintered-type nickel electrode has been widely used in the art as the nickel electrode of alkaline storage cells. In the sintered-type nickel electrode, a nickel plate is used as a conductive substrate. The nickel plate is prepared by sintering nickel powder onto a core such as perforated steel plate for preparation of a conductive substrate, and impregnating the resultant conductive substrate formed with a multitude of pores with an active material such as comprised of nickel hydroxide or the like.

In the sintered-type nickel electrode, however, particles of nickel powder bond together so weakly that increased porosity of the substrate causes the nickel powder to drop off from the substrate. The maximum porosity of the conductive substrate practically attained has therefore been up to 80%, making it difficult to impregnate the conductive substrate adequately with the active material.

The necessity of the core such as perforated steel plate leads to a low packing density of the active material. Additionally, the pores formed with nickel powder by sintering have such a small diameter of not greater than 10 μm that it is difficult to pack the active material. Consequently, the preparation of a sintered-type nickel electrode must depend solely upon a solution immersion process which requires a cycle of complicated steps to be repeated a number of times.

In an attempt to overcome such problems, for example, a paste-type nickel electrode excluding the use of a perforated steel plate has been utilized. The paste-type nickel electrode utilizes as a core body a sintered alkali-resistant metal fiber, an alkali-resistant porous metal plaque or a carbon fiber nonwoven fabric plated with an alkali-resistant metal, which is filled with a paste containing nickel hydroxide powder.

Unfortunately, the paste-type nickel electrode suffers lower conductivity and lower utilization factor of the active material than the sintered-type nickel electrode.

The paste-type nickel electrode has an additional problem that if it is filled with nickel hydroxide powder too densely, the energy density decreases at high temperatures although it increases near room temperatures. It is believed that the problem is attributable to the fact that the production reaction of oxygen is apt to occur in conjunction with the charging reaction of nickel hydroxide during charging at high temperatures. This delays oxidation of nickel hydroxide by nickel oxyhydroxide, and therefore the charging process is slowed resulting in a lowered utilization factor of nickel hydroxide.

In order to solve the above problems, there is proposed the utilization of an active material comprising a solid solution of nickel hydroxide mixed with one or more additives selected from a group consisting of zinc, cobalt, calcium, iron, magnesium, cadmium and manganese, as disclosed in, for example, Japanese Unexamined Patent Publications No.5-21064 (1993), No.5-28992 (1993), No.5-41212 (1993), and No.6-150925 (1994).

These publications, however, do not always made adequate study on a suitable combination of such additives to be mixed with nickel hydroxide for formation of a solid solution. Accordingly, the methods disclosed in these publications failed to achieve sufficient increase in the utilization factor of the active material at room temperatures and at high temperatures. Further, with an increased number of charge/discharge cycles, nickel hydroxide crystals in the nickel electrode gradually expand, changing from $\beta$-NiOOH of high density to $\gamma$-NiOOH of low density with moisture or metal ions of different kinds incorporated therein. This results in lowered density or drop off of the active material as well as depletion of electrolyte because of the moisture thereof incorporated into the nickel hydroxide crystals. As a result, the cycle characteristic of the storage cell is degraded.

SUMMARY OF THE INVENTION

A first object of the present invention is to provide a non-sintered nickel electrode for use in alkaline storage cells which has attained an increased utilization factor of nickel hydroxide both at room temperatures and high temperatures thereby providing a high discharge capacity of the cells.

Another object of the invention is to provide a non-sintered nickel electrode for use in alkaline storage cells which is of high performance, stability and productivity, as suppressing nickel hydroxide from gradually expanding with an increased number of discharge cycles.

A first mode of a non-sintered nickel electrode for use in alkaline storage cells according to the present invention comprises an active material including a solid solution of nickel hydroxide mixed with manganese, the solid solution further incorporating one or more elements selected from a group consisting of cobalt, cadmium, calcium and magnesium.

If nickel hydroxide and manganese crystals are mixed for formation of a solid solution, the resultant active material has an increased mobility of proton. If this solid solution of nickel hydroxide further incorporates one or more elements selected from the group consisting of cobalt, cadmium, calcium and magnesium, the resultant active material is dramatically enhanced in the mobility of proton, thus achieving a marked improvement of the utilization factor thereof.

In the first mode of the non-sintered nickel electrode for alkaline storage cells, if an insufficient amount of manganese is incorporated in the aforesaid solid solution of nickel hydroxide, the resultant active material cannot attain an adequate improvement of the utilization factor. On the other hand, if an excessive amount of manganese is incorporated therein, a bulk specific gravity of nickel hydroxide decreases resulting in reduced electrode capacity. It is therefore desirable that the active material comprises a solid solution incorporating 0.1% to 10.0% by weight of manganese.

A second mode of a non-sintered nickel electrode for use in alkaline storage cells according to the invention comprises an active material including a solid solution of nickel hydroxide mixed with manganese and zinc, the solid solution further incorporating one or more elements selected from a group consisting of cobalt, cadmium, calcium and magnesium.

If nickel hydroxide, manganese and zinc crystals are mixed for formation of a solid solution, the resultant active material has, as described above, an increased mobility of proton due to the action of manganese, while zinc acts to suppress expansion of nickel hydroxide thereby preventing reduction of the cycle characteristic of the cell. If the solid solution of nickel hydroxide further incorporates one or more elements selected from the group consisting of cobalt, cadmium, calcium and magnesium, the resultant active material is, as described above, notably enhanced in the utilization factor because of a marked increase in the mobility of proton. Thus, there is attained a non-sintered nickel electrode for alkaline storage cells having a high utilization factor of the active material and excellent cycle characteristic.

In preparation of the second mode of a non-sintered nickel electrode for alkaline storage cells, nickel hydroxide, manganese and zinc crystals are mixed for formation of the aforesaid solid solution which further incorporates one or more elements selected from the group consisting of cobalt, cadmium, calcium and magnesium. In order to increase the utilization factor of the resultant active material as well as to prevent expansion of nickel hydroxide thereby improving the cycle characteristic of the electrode and avoiding reduction of the electrode capacity, it is preferred that the active material comprises a solid solution incorporating 0.1% to 10.0% by weight of manganese, 0.5% to 5.0% by weight of zinc, and 0.1% to 5.0% by weight of one or more elements selected from the group consisting of cobalt, cadmium, calcium and magnesium.

A third mode of a non-sintered nickel electrode for use in alkaline storage cells according to the invention comprises an active material comprising nickel hydroxide with manganese added thereto, some of which mangenese is incorporated in a solid solution of nickel hydroxide while the rest of which manganese is present as liberated from the solid solution of nickel hydroxide.

Herein, that manganese is incorporated in a solid solution of nickel hydroxide means a state wherein nickel hydroxide and manganese crystals are mixed for formation of a solid solution, whereas that manganese is present as liberated from the solid solution of nickel hydroxide means all states except the aforesaid state of solid solution, such as wherein manganese in the form of hydroxide compounds adheres to the surface of nickel hydroxide particles. It is noted that manganese incorporated in a solid solution is bivalent while liberated manganese is tervalent.

If bivalent manganese is present in the form of a solid solution of nickel hydroxide, the mobility of proton increases to enhance the utilization factor of the resultant active material. On the other hand, if manganese is allowed to exist on the surface of nickel hydroxide powder as liberated therefrom, the overvoltage of oxygen generation reaction during charging at high temperatures can be heightened, so that nickel hydroxide is sufficiently oxidized to nickel oxyhydroxide for sufficient promotion of the charging reaction, and hence, the resultant active material has a greater utilization factor at high temperatures. As a result, it becomes possible to enhance the utilization factor of the active material in a wide range of temperatures.

In order to enhance the utilization factor of the active material in a wide range of temperatures, to prevent the reduction of the electrode capacity and to suppress the liberated manganese from acting as a reaction deterrent, it is desirable to incorporate in a solid solution 0.5% to 2% by weight of manganese atoms against the total amount of metal atoms and to allow 0.2% to 10% by weight of liberated manganese atoms to be present against the total amount of metal atoms. It is preferred that the total amount of such manganese atoms is in the range of 0.7% to 12% by weight against the total weight of metal atoms.

To prepare the aforesaid active material comprising a solid solution of nickel hydroxide incorporating some of manganese atoms, the remainder of which manganese atoms is present as liberated from the solid solution of nickel hydroxide, it is preferred to put a mixed solution of ammonia and sodium hydroxide into an aqueous solution as a mixture of nickel salt and manganese salt, allowing the active material to deposit as retaining the resultant mixture at pH 11±0.5. A salt usable as the aforesaid nickel salt includes nickel sulfate, nickel nitrate or the like. A salt usable as the aforesaid manganese salt includes manganese sulfate, manganese nitrate or the like. If the active material is allowed to deposit in the above manner, particles of a relatively large size may be obtained although the deposition of nickel and manganese is slow requiring much time for crystal growth. In this process, some bivalent manganese atoms become tervalent as oxidized by dissolved oxygen or the like, so that the remaining bivalent manganese atoms may be incorporated in a solid solution of nickel hydroxide while the tervalent manganese atoms are not incorporated therein but are present as liberated from the solid solution of nickel hydroxide.

According to a method, disclosed in Japanese Unexamined Patent Publications No.5-21064 (1993), No.5-28992 (1993) and No.5-41212 (1993), in which an aqueous solution of sodium hydroxide is added to an aqueous solution as a mixture of nickel salt and salt(s) of replacing metal(s), the active material is deposited so fast that manganese atoms are not virtually oxidized, being entirely incorporated in a solid solution of nickel hydroxide with no liberated manganese atoms allowed to exist. This results in a marked decrease in the utilization factor of the active material at high temperatures. In the pH range of 10.5 or less, there is yielded an active material comprising nickel hydroxide containing anions of used salts or water therein, while in the pH range of 11.5 or more, the deposition of an active material is fast. In both cases, the bulk specific gravity of the active material is reduced and hence, the electrode capacity is reduced.

In the third mode of the non-sintered nickel electrode for alkaline storage cells, it is also desirable that the aforesaid solid solution of nickel hydroxide and manganese further incorporates, as described above, one or more elements selected from a group consisting of cobalt, zinc, cadmium, calcium, barium and magnesium. The solid solution incorporating these elements could further enhance the utilization factor of the active material and prevent expansion of nickel hydroxide thereby providing a non-sintered nickel electrode excellent in the cycle characteristic.

To fabricate a non-sintered nickel electrode using the aforesaid active material, the aforesaid active material of various types is generally filled in a porous substrate. A preferred porous substrate for use includes a sintered metal fiber, punching metal, porous metal, foamed metal or the like.

It is to be understood that the object and form of the present invention should not be limited to those described herein and that various changes may be resorted to without departing from the spirit of the invention or the scope of the claims set forth herein.

DESCRIPTION OF THE PREFERRED EMBODIMENTS

Figure 1:
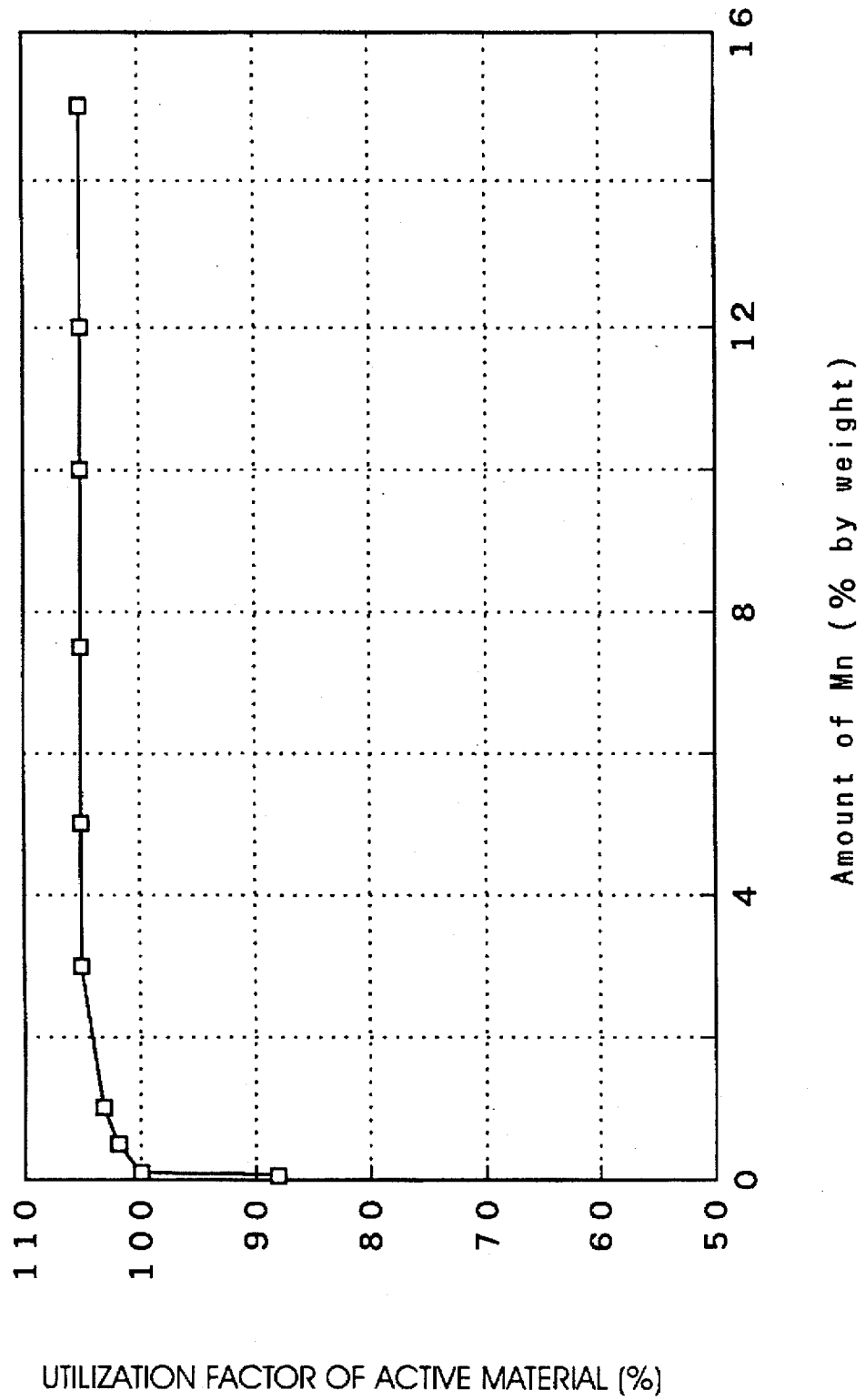
FIG. 1 is a graphical representation of the relationship between the amount of manganese incorporated in a solid solution of nickel hydroxide and the utilization factor of an active material in Experiment 1.

The first mode of a non-sintered nickel electrode of the present invention will be described in detail by way of the examples thereof and the excellent features thereof will be clarified by comparison with comparative examples.

EXAMPLES 1 THROUGH 7

[Preparation of Active Materials]

In Example 1, aqueous solutions of nickel sulfate, manganese sulfate and magnesium sulfate were mixed together to prepare an aqueous solution as a mixture of nickel sulfate, manganese sulfate and magnesium sulfate in the weight ratio of 89.6:1.7:8.7. The resultant mixture of aqueous solutions together with 5% by weight of aqueous ammonia were added to water maintained at 35° C. in a water tank, and after one hour's mixing, 20% by weight of sodium hydroxide was added dropwise thereto as agitated and maintained at pH 11±0.3, whereby a deposit was obtained. The pH was measured by the use of an automatic temperature compensated glass electrode pH meter.

Next, the resultant deposit was filtered, and the residue was washed with water and vacuum-dried to yield an active material in the form of a solid solution of nickel hydroxide mixed with manganese and magnesium. The resultant active material, as shown in Table 1 as below, contained 1% by weight of manganese and 3% by weight of magnesium.

In Examples 2 through 7, aqueous solutions of nickel sulfate and manganese sulfate were mixed with any of aqueous solutions of cobalt sulfate, magnesium sulfate, cadmium sulfate and calcium nitrate as properly combined. Then, active materials were prepared in the same manner as aforesaid Example 1. As shown in Table 1, the resultant active materials comprised a solid solution of nickel hydroxide mixed with manganese, the solid solution further incorporating one or more elements selected from the group consisting of cobalt, cadmium and calcium. The active materials of Examples 2 through 7 contained 1% by weight of manganese and 3% by weight of any of cobalt, cadmium and calcium respectively.

[Preparation of Electrodes]

In preparation of electrodes, pastes were prepared by kneading 90 parts by weight of the above active material, 10 parts by weight of cobalt hydroxide and 20 parts by weight of aqueous solution of methylcellulose (content: 1% by weight) respectively. The resultant pastes were each filled in a porous body such as formed of nickel-plated porous metal (porosity: 95%, average pore size: 200 µm). The porous body is used as a conductive substrate in a positive electrode. The porous bodies thus filled were dried to be shaped into non-sintered nickel electrodes of Examples 1 to 7.

[Preparation of Cells]

Non-sintered nickel electrodes of Examples 1 through 7 were used as the positive electrode of nickel-cadmium storage cells. The nickel-cadmium storage cells were prepared by assembling the non-sintered nickel electrode of Examples 1 through 7, a known paste-type cadmium electrode, a nylon nonwoven separator, alkaline electrolyte, a metal cell container, a metal lid and other components. An aqueous solution of 30% by weight of KOH was used as the electrolyte.

COMPARATIVE EXAMPLES 1 THROUGH 6

In Comparative Examples 1 through 6, active materials were prepared in the same manner as the aforesaid examples except that an aqueous solution of manganese sulfate was not added but any of aqueous solutions of nickel sulfate, magnesium sulfate, cobalt sulfate, cadmium sulfate and calcium nitrate were mixed together as properly combined. Thus were obtained the active materials comprising a solid solution of nickel hydroxide mixed with one or more elements selected from a group consisting of magnesium, cobalt, cadmium and calcium, as shown in Table 1 as below. The active materials were used to fabricate nickel-cadmium cells in the same manner as the aforementioned examples.

COMPARATIVE EXAMPLE 7

In Comparative Example 7, an active material was prepared in the same manner as the aforesaid examples except that aqueous solutions of nickel sulfate, manganese sulfate and zinc sulfate were mixed together to prepare an aqueous solution as a mixture of nickel sulfate, manganese sulfate and zinc sulfate in the weight ratio of 93.9:1.7:4.4. The resultant active material comprised a solid solution of nickel hydroxide mixed with manganese and zinc, as shown in Table 1 as below. The active material was used to fabricate a nickel-cadmium cell in the same manner as the aforesaid examples.

COMPARATIVE EXAMPLE 8

In Comparative Example 8, an active material was prepared in the same manner as the aforesaid examples except that aqueous solutions of nickel sulfate, manganese sulfate and barium nitrate were mixed together to prepare an aqueous solution as a mixture of nickel sulfate, manganese sulfate and barium nitrate in the weight ratio of 96.8:1.0:2.2. The resultant active material comprised a solid solution of nickel hydroxide mixed with manganese and barium, as shown in Table 1 as below. The active material was to fabricate a nickel-cadmium cell in the same manner as the aforesaid examples.

[Test Conditions for Cells]

Next, the characteristics of the cells of Examples 1 through 7 and Comparative Examples 1 through 8 prepared as described above were compared. In the examination of the cell characteristics, the storage cells were charged with 0.1 C rate to the depth of 160% at 25° C. and then discharged with 1 C rate at 25° C. (reduction of 1.0 V), whereby the utilization factor of the respective cells were found. The results are shown in Table 1 as below.

TABLE 1

| | Additive to Active Material(% by weight) | | | | | | | U.Factor |
|---|---|---|---|---|---|---|---|---|
| | Mn | Mg | Co | Cd | Ca | Zn | Ba | (%) |
| Ex. 1 | 1 | 3 | | | | | | 105 |
| Ex. 2 | 1 | | 3 | | | | | 105 |
| Ex. 3 | 1 | | | 3 | | | | 105 |
| Ex. 4 | 1 | | | | 3 | | | 105 |
| Ex. 5 | 1 | 3 | 3 | | | | | 108 |
| Ex. 6 | 1 | | 3 | 3 | | | | 108 |
| Ex. 7 | 1 | 3 | | | 3 | | | 108 |
| C. Ex. 1 | | 3 | | | | | | 92 |
| C. Ex. 2 | | | 3 | | | | | 92 |
| C. Ex. 3 | | | | 3 | | | | 92 |
| C. Ex. 4 | | | | | 3 | | | 92 |
| C. Ex. 5 | | 3 | 3 | | | | | 94 |
| C. Ex. 6 | | | 3 | 3 | | | | 94 |
| C. Ex. 7 | 1 | | | | | 3 | | 94 |
| C. Ex. 8 | 1 | | | | | | 3 | 93 |

It was found from the results that the cells of Examples 1 through 7 had higher utilization factors than those of Comparative Examples 1 through 6, 7 and 8, Examples 1 through 7 employing the active materials comprising a solid solution of nickel hydroxide mixed with manganese which further incorporated one or more elements selected from the group consisting of magnesium, cobalt, cadmium and calcium, Comparative Examples 1 through 6 employing the active materials comprising a solid solution of nickel hydroxide not mixed with manganese, and Comparative Examples 7 and 8 employing the active materials comprising a solid solution of nickel hydroxide mixed with manganese which further incorporated either zinc or barium instead of magnesium, cobalt, cadmium and calcium. Although not given as Comparative Examples, cells employing active materials comprising a solid solution of nickel hydroxide mixed with manganese, the solid solution further incorporating indium or aluminum, also exhibited lower utilization factors than those of Examples 1 through 7.

Experiment 1

In this experiment, the utilization factor of active materials were examined by varying the amount of manganese to be incorporated in a solid solution of nickel hydroxide.

In this experiment, there were prepared active materials comprising a solid solution of nickel hydroxide mixed with 3% by weight of magnesium, the solid solution further incorporating different amounts of manganese such as 0.05% by weight, 0.1% by weight, 0.5% by weight, 1.0% by weight, 3.0% by weight, 5.0% by weight, 7.5% by weight, 10.0% by weight, 12.0% by weight and 15.0% by weight. The resultant active materials were used to fabricate storage cells in the same manner as the above examples. The utilization factors of the cells were measured in the aforesaid manner, and the results are given in FIG. 1, wherein the added amount of manganese (% by weight) is plotted as abscissa and the utilization factor of the active material (%) as ordinate.

As apparent from the results, if a solid solution of nickel hydroxide incorporates not less than 0.1% by weight of manganese, the utilization factor of the active material increases notably. Accordingly, it is desirable that the solid solution of nickel hydroxide is mixed with more than 0.1% by weight of manganese.

Figure 2:
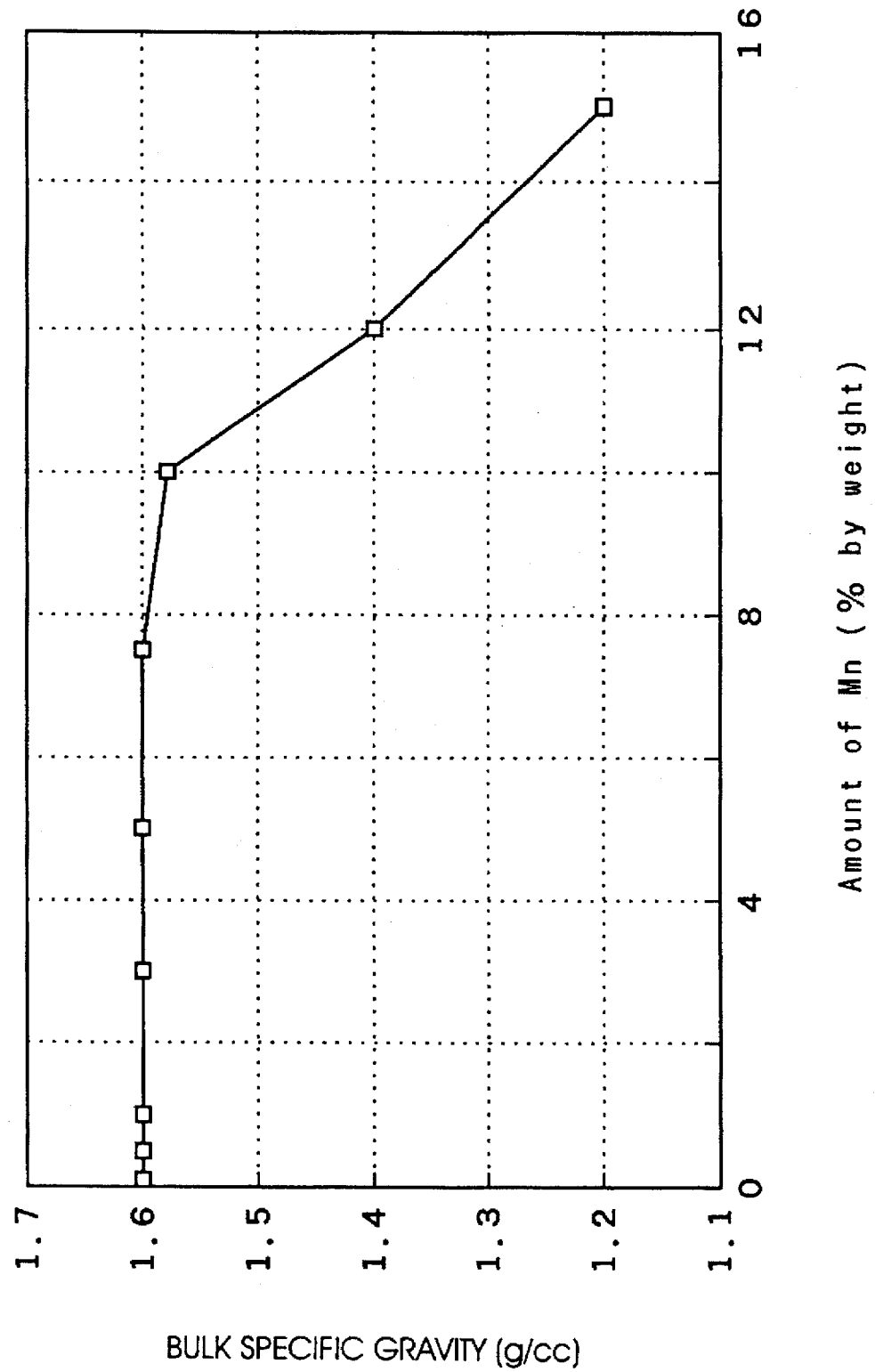
FIG. 2 is a graphical representation of the relationship between the amount of manganese incorporated in a solid solution of nickel hydroxide and the bulk specific gravity of an active material in Experiment 1.

Next, measurement was taken on the bulk specific gravity of the active materials thus prepared, and the results are given in FIG. 2, wherein the added amount of manganese (% by weight) is plotted as abscissa and the bulk specific gravity (g/cc) as ordinate. The bulk specific gravity was measured by the use of an apparatus specified by JIS-K-5101.

The results indicate that if a solid solution of nickel hydroxide incorporates more than 10% by weight of manganese, there is a sharp decrease in the bulk specific gravity. Accordingly, it is desirable that a solid solution of nickel hydroxide incorporates less than 10% by weight of manganese.

It was found from these results that a desirable amount of manganese to be incorporated in a solid solution of nickel hydroxide is in the range of from 0.1% by weight to 10% by weight.

Now, the second mode of the non-sintered nickel electrode according to the invention will be described in detail by way of the examples thereof, and the excellent features of thereof will be clarified by comparison with Comparative Examples.

EXAMPLES 8 THROUGH 13

[Preparation of Active Materials]

In Example 8, aqueous solutions of nickel sulfate, manganese sulfate, zinc sulfate and cobalt sulfate were mixed together to prepare an aqueous solution as a mixture of nickel sulfate, manganese sulfate, zinc sulfate and cobalt sulfate in the weight ratio of 88.8:1.7:4.6:4.9. The resultant aqueous solution together with 5% by weight of aqueous ammonia was put into water maintained at 35° C. in a water tank, and after one hour's mixing, 20% by weight of sodium hydroxide was added dropwise thereto as agitated and maintained at pH 11±0.3, thereby to obtain a deposit. The pH was measured by the use of an automatic temperature compensated glass electrode pH meter.

The resultant deposit was filtered, and the residue was washed with water and vacuum-dried to yield an active material comprising a solid solution of nickel hydroxide mixed with manganese, zinc and cobalt. The resultant active material, as shown in Table 2 as below, contained 1% by weight of manganese, 3% by weight of zinc and 3% by weight of cobalt.

In Examples 9 through 13, aqueous solutions of nickel sulfate, manganese sulfate and zinc sulfate were mixed with any of aqueous solutions of cobalt sulfate, cadmium sulfate, magnesium sulfate and calcium nitrate as properly combined. These aqueous solutions were mixed together to prepare active materials in the same manner as aforesaid Example 8. As shown in Table 2, the active materials comprised a solid solution of nickel hydroxide mixed with manganese and zinc, the solid solution further incorporating one or more elements selected from a group consisting of cobalt, cadmium, magnesium and calcium. The active materials of Examples 9 through 13 contained 1% by weight of manganese, 3% by weight of zinc, and 3% by weight of any of cobalt, cadmium, magnesium and calcium respectively, as shown in the same table.

[Preparation of Electrodes]

In preparation of electrodes, pastes were prepared by kneading 90 parts by weight of the above active material, 10 parts by weight of cobalt hydroxide and 20 parts by weight of aqueous solution of methylcellulose (content: 1% by weight) respectively. The resultant pastes were each filled in a porous body such as formed of nickel plated porous metal (porosity: 95%, average pore size: 200 µm). The porous bodies thus filled were dried to be shaped into non-sintered nickel electrodes of Examples 8 through 13.

[Preparation of Cells]

Non-sintered nickel electrodes of Examples 8 through 13 were used as the positive electrode of nickel-cadmium storage cells. Similarly to the aforesaid examples, the nickel-cadmium storage cells were prepared by assembling the non-sintered nickel electrode of Examples 8 through 13, a known paste-type cadmium electrode, a nylon nonwoven separator, alkaline electrolyte, a metal cell container, a metal lid and other components. An aqueous solution of 30% by weight of KOH was used as the electrolyte.

COMPARATIVE EXAMPLE 9

In Comparative Example 9, an active material was prepared in the same manner as the aforesaid examples except that aqueous solutions of zinc sulfate and cobalt sulfate were not added but only aqueous solutions of nickel sulfate and magnesium sulfate were mixed together. The resultant active material, as shown in Table 2 as below, comprised a solid solution of nickel hydroxide incorporating 1% by weight of manganese alone. The resultant active material was used to fabricate a nickel-cadmium cell in the same manner as the aforesaid examples.

COMPARATIVE EXAMPLES 10 THROUGH 15

In Comparative Examples 10 through 15, active materials were prepared in the same manner as the aforesaid examples except that an aqueous solution of zinc sulfate was not added but aqueous solutions of nickel sulfate and manganese sulfate were mixed with any of aqueous solutions of magnesium sulfate, cobalt sulfate, cadmium sulfate and calcium nitrate as properly combined. As shown in Table 2 as below, the resultant active materials comprised a solid solution of nickel hydroxide mixed with manganese, the solid solution further incorporating one or more elements selected from a group consisting of magnesium, cobalt, cadmium and calcium. The active materials were used to fabricate nickel-cadmium cells in the same manner as the aforesaid examples.

COMPARATIVE EXAMPLES 16 THROUGH 21

In Comparative Examples 16 through 21, active materials were prepared in the same manner as the aforesaid examples except that aqueous solutions of zinc sulfate and manganese sulfate were not added but an aqueous solution of nickel sulfate was mixed with any of aqueous solutions of magnesium sulfate, cobalt sulfate, cadmium sulfate and calcium nitrate as properly combined. As shown in Table 2 as below, the resultant active materials comprised a solid solution of nickel hydroxide mixed with one or more elements selected from a group consisting of magnesium, cobalt, cadmium and calcium. The active materials were used to fabricate nickel-cadmium cells in the same manner as the aforesaid examples.

COMPARATIVE EXAMPLE 22

In this comparative example, an active material was prepared in the same manner as the foresaid examples except that aqueous solutions of magnesium sulfate, cobalt sulfate, cadmium sulfate and calcium nitrate were not used but only aqueous solutions of nickel sulfate, manganese sulfate and zinc sulfate were used. As shown in Table 2 as below, the resultant active material comprised a solid solution of nickel hydroxide mixed with 1% by weight of manganese and 3% by weight of zinc. The active material was used to fabricate a nickel-cadmium cell in the same manner as the aforesaid examples.

COMPARATIVE EXAMPLE 23

In preparation of an active material of Comparative Example 23, aqueous solutions of nickel sulfate, manganese sulfate and zinc sulfate were mixed together to prepare an aqueous solution as a mixture of nickel sulfate, manganese sulfate and zinc sulfate in the weight ratio of 93.9:1.7:4.4. Then, 20% by weight of sodium hydroxide was added dropwise to the resultant aqueous solution, as vigorously agitated and maintained at pH 11.0±0.3. The temperature during agitation was fixed at 35° C. The resultant deposit was filtered and the residue was washed with water and vacuum-dried to yield the active material comprising a solid solution of nickel hydroxide mixed with 1% by weight of manganese and 3% by weight of zinc. The resultant active material was used to fabricate a nickel-cadmium cell in the same manner as the aforesaid examples.

A method employed to prepare the active material of Comparative Example 23 is similar to those disclosed in Japanese Unexamined Patent Publications No.5-21064 (1993) and No.5-41212 (1993). The active material obtained by this comparative example is similar to those exemplified as embodiments in those publications.

[Test Conditions for Cells]

Next, the cells prepared in Examples 8 through 13 and Comparative Examples 9 through 23 mentioned above were subject to a cycle test by charging the cells with 0.1 C rate to the depth of 160% at the ambient temperature of 25° C. and then discharging them with of 1 C rate (reduction of 1.0 V) at the ambient temperature of 25° C. With respect to each of the cells, a utilization factor of the active material at the tenth cycle and an expansion coefficient of the electrode at the hundredth cycle were determined. The results are given in Table 2 as below. The electrode expansion coefficient was found by the following equation 1:

$$E.E.C.(\%) = \frac{(d_{100} - d_0)}{d_0} \times 100 \qquad (1)$$

wherein $d_0$ represents the thickness of a nickel electrode before the assembly thereof, and $d_{100}$ represents the thickness of the nickel electrode which was diassembled for measurement after discharge at the hundredth cycle.

TABLE 2

|  | Active Material Composition (%) | | | | | | U.Factor | E.E.C. |
|---|---|---|---|---|---|---|---|---|
|  | Mn | Zn | Co | Cd | Mg | Ca | (%) | (%) |
| Ex. 8 | 1 | 3 | 3 |  |  |  | 105 | 10 |
| Ex. 9 | 1 | 3 |  | 3 |  |  | 105 | 10 |
| Ex. 10 | 1 | 3 |  |  | 3 |  | 105 | 10 |
| Ex. 11 | 1 | 3 |  |  |  | 3 | 105 | 10 |
| Ex. 12 | 1 | 3 | 3 | 3 |  |  | 108 | 10 |
| Ex. 13 | 1 | 3 |  |  | 3 | 3 | 108 | 10 |
| C. Ex. 9 | 1 |  |  |  |  |  | 97 | 32 |
| C. Ex. 10 | 1 |  | 3 |  |  |  | 105 | 28 |
| C. Ex. 11 | 1 |  |  | 3 |  |  | 105 | 28 |
| C. Ex. 12 | 1 |  |  |  | 3 |  | 105 | 28 |
| C. Ex. 13 | 1 |  |  |  |  | 3 | 105 | 28 |
| C. Ex. 14 | 1 |  | 3 | 3 |  |  | 108 | 25 |
| C. Ex. 15 | 1 |  |  |  | 3 | 3 | 108 | 25 |
| C. Ex. 16 |  |  | 3 |  |  |  | 92 | 32 |
| C. Ex. 17 |  |  |  | 3 |  |  | 92 | 32 |
| C. Ex. 18 |  |  |  |  | 3 |  | 92 | 32 |
| C. Ex. 19 |  |  |  |  |  | 3 | 92 | 32 |
| C. Ex. 20 |  |  | 3 | 3 |  |  | 94 | 30 |
| C. Ex. 21 |  |  |  |  | 3 | 3 | 94 | 30 |
| C. Ex. 22 | 1 | 3 |  |  |  |  | 94 | 13 |
| C. Ex. 23 | 1 | 3 |  |  |  |  | 92 | 15 |

It was found from the results that the cells of Examples 8 through 13 had higher utilization factors than Comparative Examples 9, 16 through 21, 22 and 23; Examples 8 through 13 employing the active materials comprising a solid solution of nickel hydroxide mixed with manganese and zinc which solid solution further incorporated one or more elements selected from the group consisting of magnesium, cobalt, cadmium and calcium, Comparative Example 9 employing the active material comprising a solid solution of nickel hydroxide mixed with manganese alone, Comparative Examples 16 through 21 employing the active materials comprising a solid solution of nickel hydroxide mixed with no manganese, and Comparative Examples 22 and 23 employing the active material comprising a solid solution of nickel hydroxide mixed with either manganese or zinc. The results also indicated that the cells of Examples 8 through 13 exhibited smaller electrode expansion than those of Comparative Examples 9 through 21 employing the active material comprising a solid solution of nickel hydroxide mixed with no zinc.

Experiment 2

In this experiment, similarly to aforesaid Example 8, aqueous solutions of nickel sulfate, manganese sulfate, zinc sulfate and cobalt sulfate were mixed together so as to allow a solid solution of nickel hydroxide to be mixed with manganese, zinc and cobalt.

In this experiment, there were used active materials comprising a solid solution of nickel hydroxide mixed with 3% by weight of zinc and cobalt respectively, the solid solution further incorporating different amounts of manganese such as 0.05% by weight, 0.1% by weight, 0.5% by weight, 1.0% by weight, 3.0% by weight, 5.0% by weight, 7.5% by weight, 10.0% by weight, 12.0% by weight and 15.0% by weight. The resultant active materials were used to fabricate the cells in the same manner as aforesaid Example 8.

Figure 3:
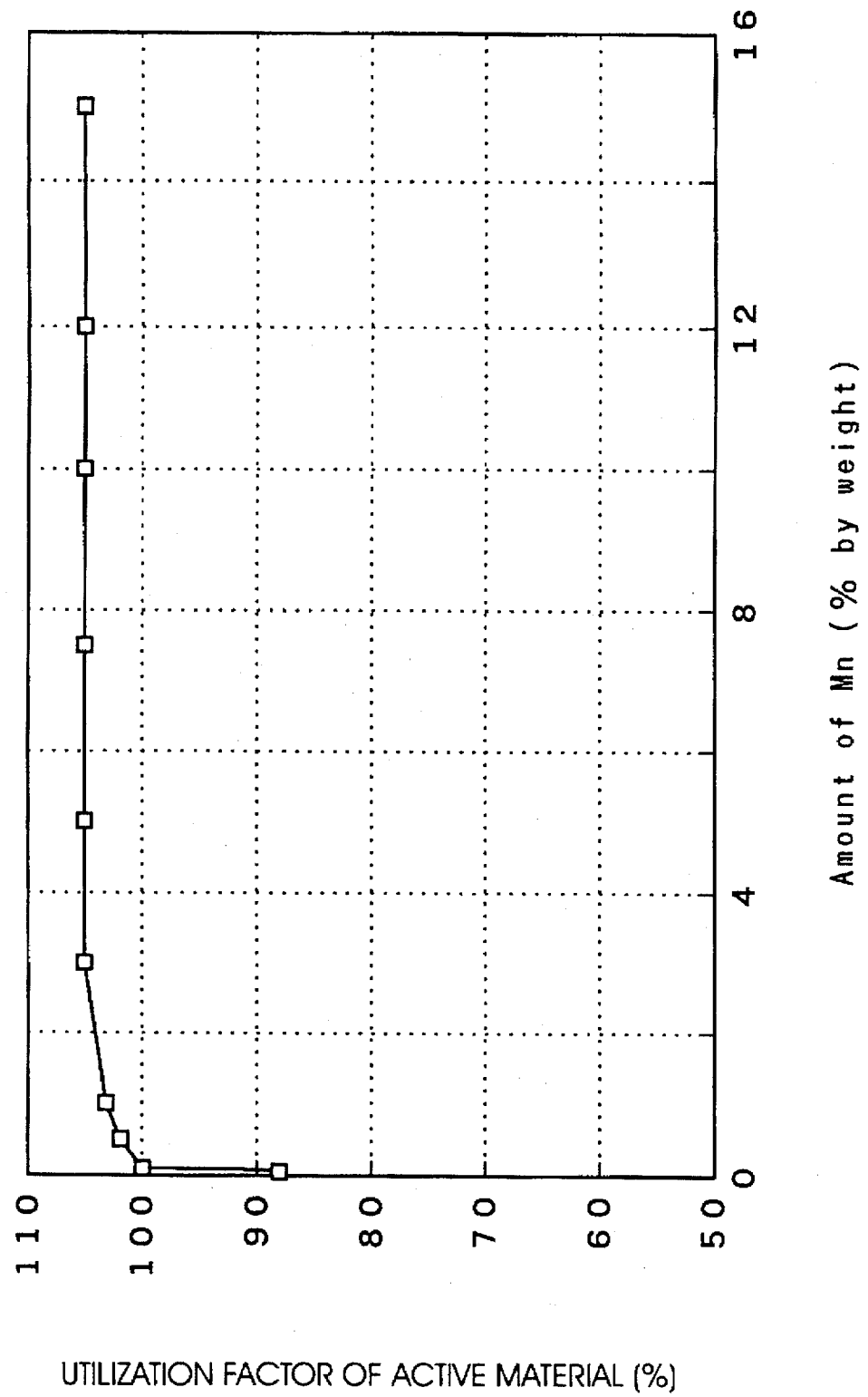
FIG. 3 is a graphical representation of the relationship between the amount of manganese incorporated in a solid solution of nickel hydroxide and the utilization factor of an active material in Experiment 2.

The utilization factor of the cells was measured in the aforesaid manner, and the results are given in FIG. 3, wherein the added amount of manganese (% by weight) is plotted as abscissa and the utilization factor of the active material (%) as ordinate.

As apparent from the results, if a solid solution of nickel hydroxide incorporates not less than 0.1% by weight of manganese, the resultant active material attains a notable increase of the utilization factor. Accordingly, it is desirable that the solid solution of nickel hydroxide is mixed with more than 0.1% by weight, and particularly more than 1% by weight of manganese.

Figure 4:
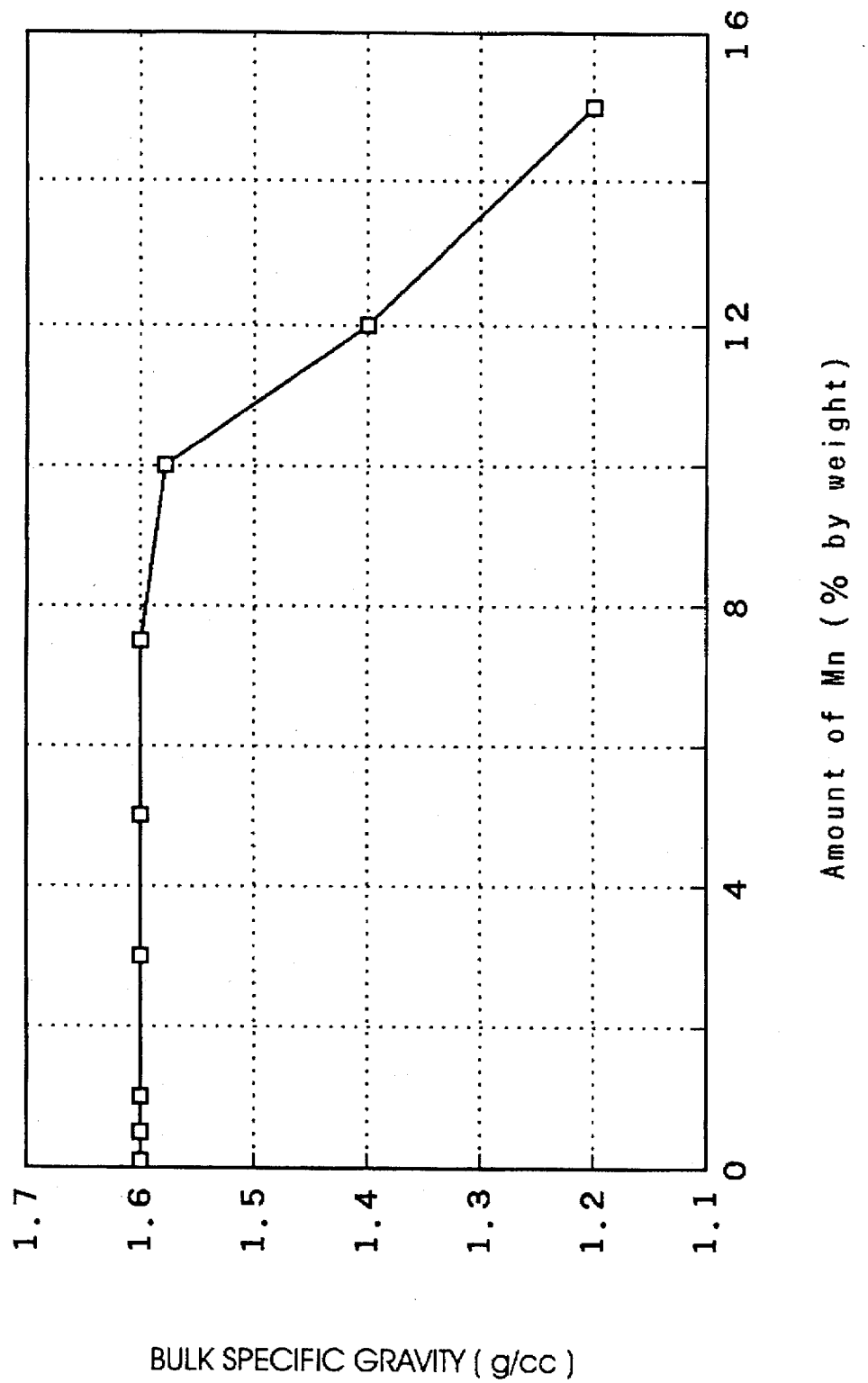
FIG. 4 is a graphical representation of the relationship between the amount of manganese incorporated in a solid solution of nickel hydroxide and the bulk specific gravity of an active material in Experiment 2.

Next, measurement was taken on the bulk specific gravity of the active materials thus prepared, and the results are given in FIG. 4, wherein the added amount of manganese (% by weight) is plotted as abscissa and the bulk specific gravity (g/cc) as ordinate. The bulk specific gravity was measured by the use of an apparatus specified by JIS-K-5101.

The results indicate that if more than 10% by weight of manganese is incorporated in the solid solution of nickel hydroxide, there is a sharp decrease in the bulk specific gravity. Accordingly, it is desirable that less than 10% by weight, particularly less than 7.5% by weight of manganese is incorporated in the solid solution of nickel hydroxide.

It was found from these results that a desirable amount of manganese to be incorporated in the solid solution of nickel hydroxide is in the range of from 0.1% to 10% by weight, and more particularly from 1% to 7.5% by weight.

Experiment 3

In this experiment, similarly to aforesaid Example 8, aqueous solutions of nickel sulfate, manganese sulfate, zinc sulfate and cobalt sulfate were mixed together so as to allow a solid solution of nickel hydroxide to be mixed with manganese, zinc and cobalt.

In this experiment, there were prepared active materials comprising a solid solution of nickel hydroxide mixed with 1% by weight of manganese and 3% by weight of cobalt, the solid solution further incorporating different amounts of zinc such as 0.1% by weight, 0.3% by weight, 0.5% by weight, 1.0% by weight, 3.0% by weight, 5.0% by weight, 7.5% by weight and 10.0% by weight. The resultant active materials were used to fabricate cells in the same manner as aforesaid Example 8.

Figure 5:
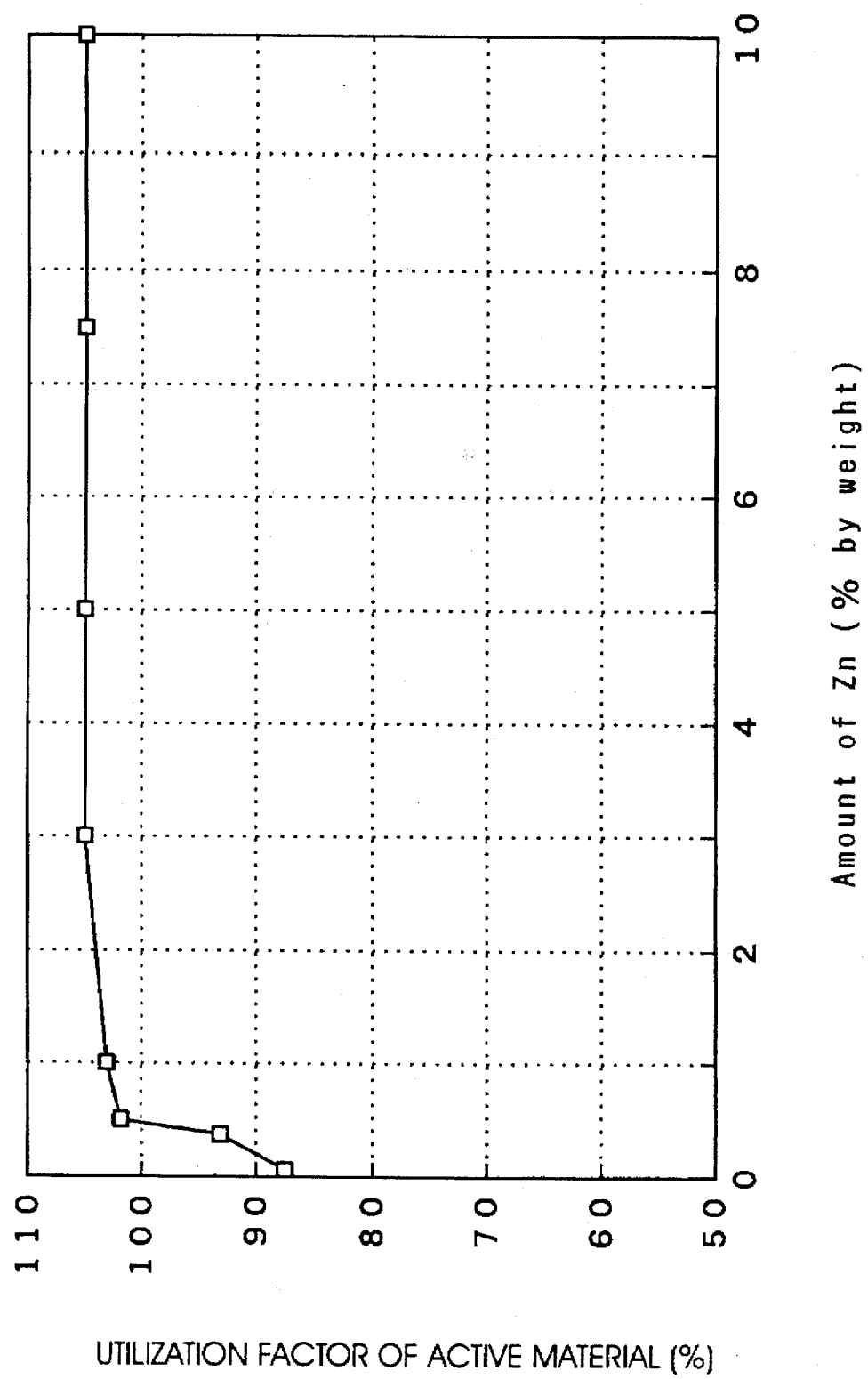
FIG. 5 is a graphical representation of the relationship between the amount of zinc incorporated in a solid solution of nickel hydroxide and the utilization factor of an active material in Experiment 3.

The utilization factor of the cells was measured in the aforesaid manner, and the results are given in FIG. 5, wherein the added amount of zinc (% by weight) is plotted as abscissa and the utilization factor of the active material (%) as ordinate.

As apparent from the results, if not less than 0.5% by weight of zinc is incorporated in the solid solution of nickel hydroxide, the resultant active material attains a marked increase of the utilization factor. Accordingly, it is desirable that more than 0.5% by weight of zinc is incorporated in the solid solution of nickel hydroxide.

Figure 6:
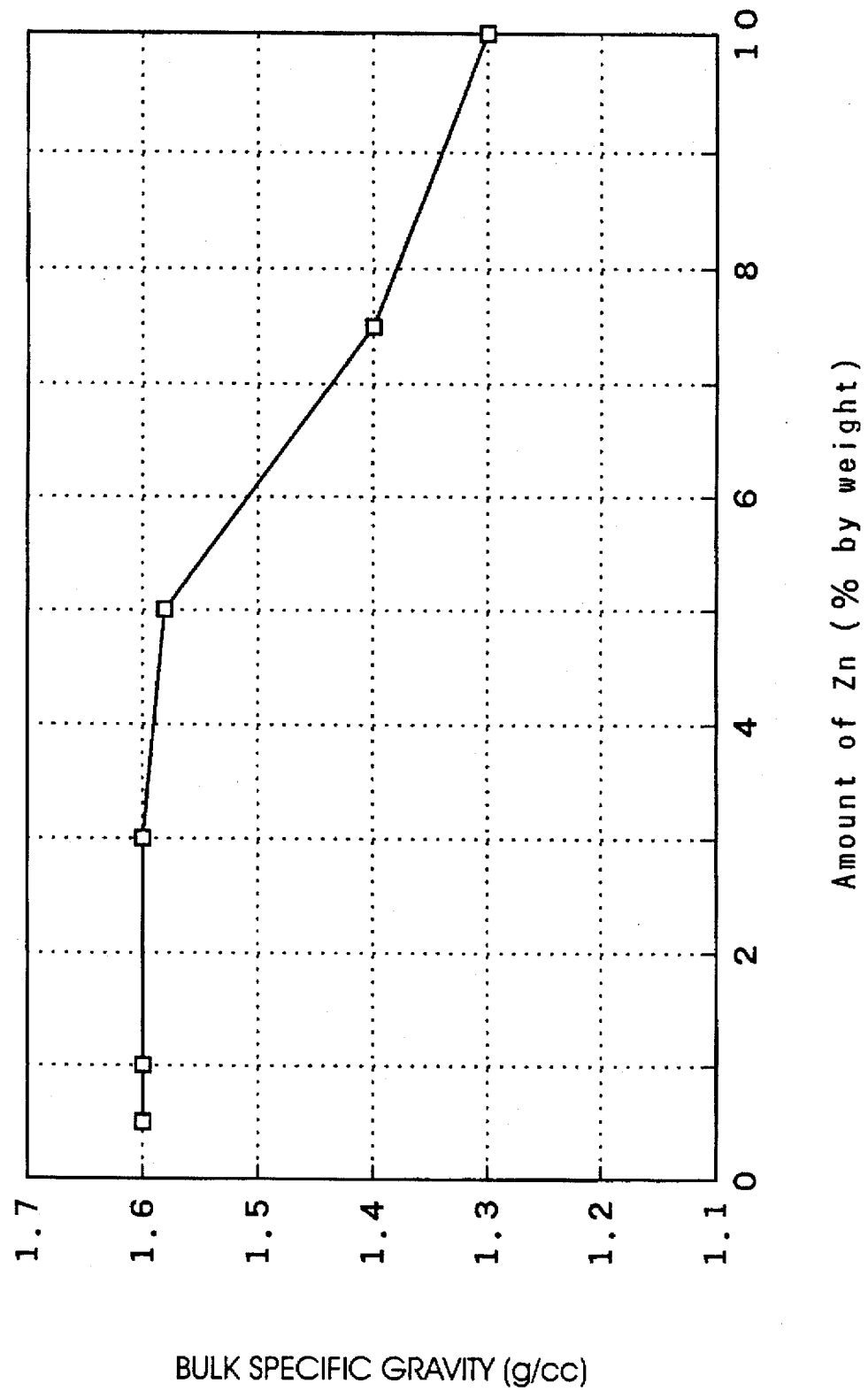
FIG. 6 is a graphical representation of the relationship between the amount of zinc incorporated in a solid solution of nickel hydroxide and the bulk specific gravity of an active material in Experiment 3.

Next, measurement was taken on the bulk specific gravity of the resultant active materials, and the results are given in FIG. 6, wherein the added amount of zinc (% by weight) is plotted as abscissa and the bulk specific gravity (g/cc) as ordinate. The bulk specific gravity was measured by the use of an apparatus specified by JIS-K-5101.

The results indicate that if more than 5% by weight of zinc is incorporated in a solid solution of nickel hydroxide, there is a sharp decrease in the bulk specific gravity. Accordingly, it is desirable that less than 5% by weight of zinc is incorporated in a solid solution of nickel hydroxide.

Experiment 4

In this experiment, similarly to aforesaid Example 8, aqueous solutions of nickel sulfate, manganese sulfate, zinc sulfate and cobalt sulfate were mixed together so as to allow a solid solution of nickel hydroxide to be mixed with manganese, zinc and cobalt.

In this experiment, there were prepared active materials comprising a solid solution of nickel hydroxide mixed with 1% by weight of manganese and 3% by weight of zinc, the solid solution further incorporating different amounts of cobalt such as 0.05% by weight, 0.1% by weight, 0.5% by weight, 1.0% by weight, 3.0% by weight, 5.0% by weight, 7.5% by weight and 10.0% by weight. The resultant active materials were used to fabricate the cells in the same manner as aforesaid Example 8.

Figure 7:
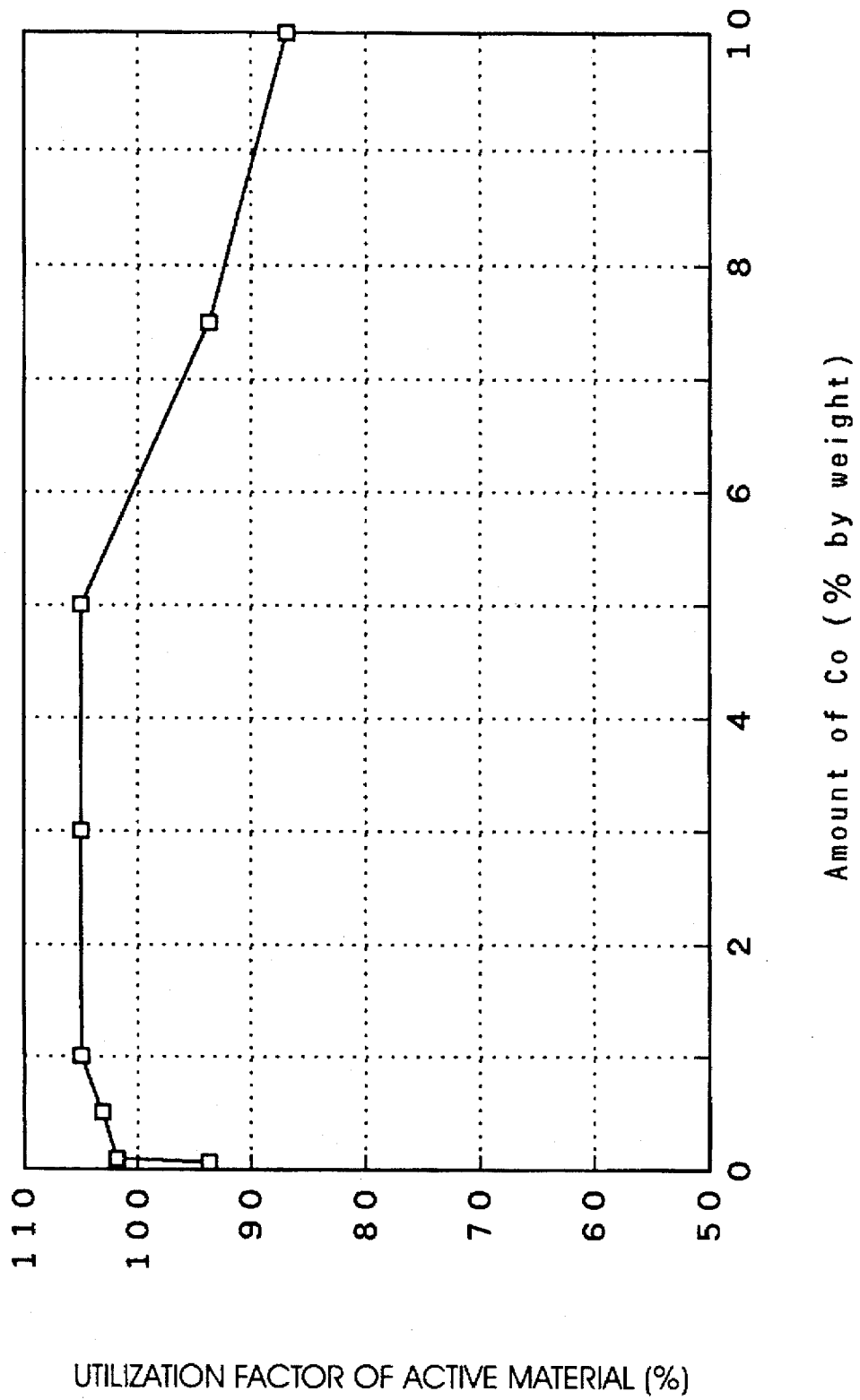
FIG. 7 is a graphical representation of the relationship between the amount of cobalt incorporated in a solid solution of nickel hydroxide and the utilization factor of an active material in Experiment 4.

The utilization factor of the cells was measured in the aforesaid manner, and the results are given in FIG. 7, wherein the added amount of cobalt (% by weight) is plotted as abscissa and the utilization factor of the active material (%) as ordinate.

As apparent from the results, if 0.1% to 5% by weight of cobalt is incorporated in the solid solution of nickel hydroxide, the resultant active material attains an increased utilization factor. Accordingly, it is desirable to incorporate 0.1% to 5% by weight of cobalt in the solid solution of nickel hydroxide.

Although this experiment studied only the solid solution of nickel hydroxide mixed with manganese and zinc which further incorporated cobalt, a similar tendency was observed in cases where other elements such as cadmium, calcium and magnesium were incorporated therein.

Now, the third mode of a non-sintered nickel electrode according to the invention will be described in detail by way of the examples hereof.

EXAMPLES 14 THROUGH 22

[Preparation of Active Materials]

In this experiment, aqueous solutions of nickel sulfate and manganese sulfate were mixed together to prepare an aqueous solution as a mixture of nickel sulfate and manganese sulfate at a suitable weight ratio. The resultant aqueous solution, together with an alkaline aqueous solution as a 5:1 mixture of 20% by weight of an aqueous solution of sodium hydroxide and an aqueous solution of ammonia, were put into water maintained at 35° C. in a water tank, and was maintained at pH 11±0.5 whereby a deposit was obtained. The pH was measured by the use of an automatic temperature compensated glass electrode pH meter.

The resultant deposit was filtered, and the residue was washed with water and vacuum-dried to yield active materials comprising a solid solution of nickel hydroxide mixed with manganese.

In the aforesaid preparation process of the active material, nickel ions and manganese ions react with ammonia to form ammine complex ions containing nickel and manganese. The ammine complex ions are decomposed by sodium hydroxide to form nickel hydroxide. The growth of nickel hydroxide crystals is so rate-determined by pH control as to allow them grow slowly. On the other hand, manganese comes to include tervalent manganese atoms which are in higher order as oxidized by dissolved oxygen, and bivalent manganese atoms which are not oxidized and incorporated in nickel hydroxide crystals. The tervalent manganese atoms exist as liberated from the nickel hydroxide crystals. As a result, there is obtained the active material mixed with manganese, some of which manganese is incorporated in the solid solution of nickel hydroxide while the remainder thereof being liberated from the solid solution of nickel hydroxide.

Figure 8:
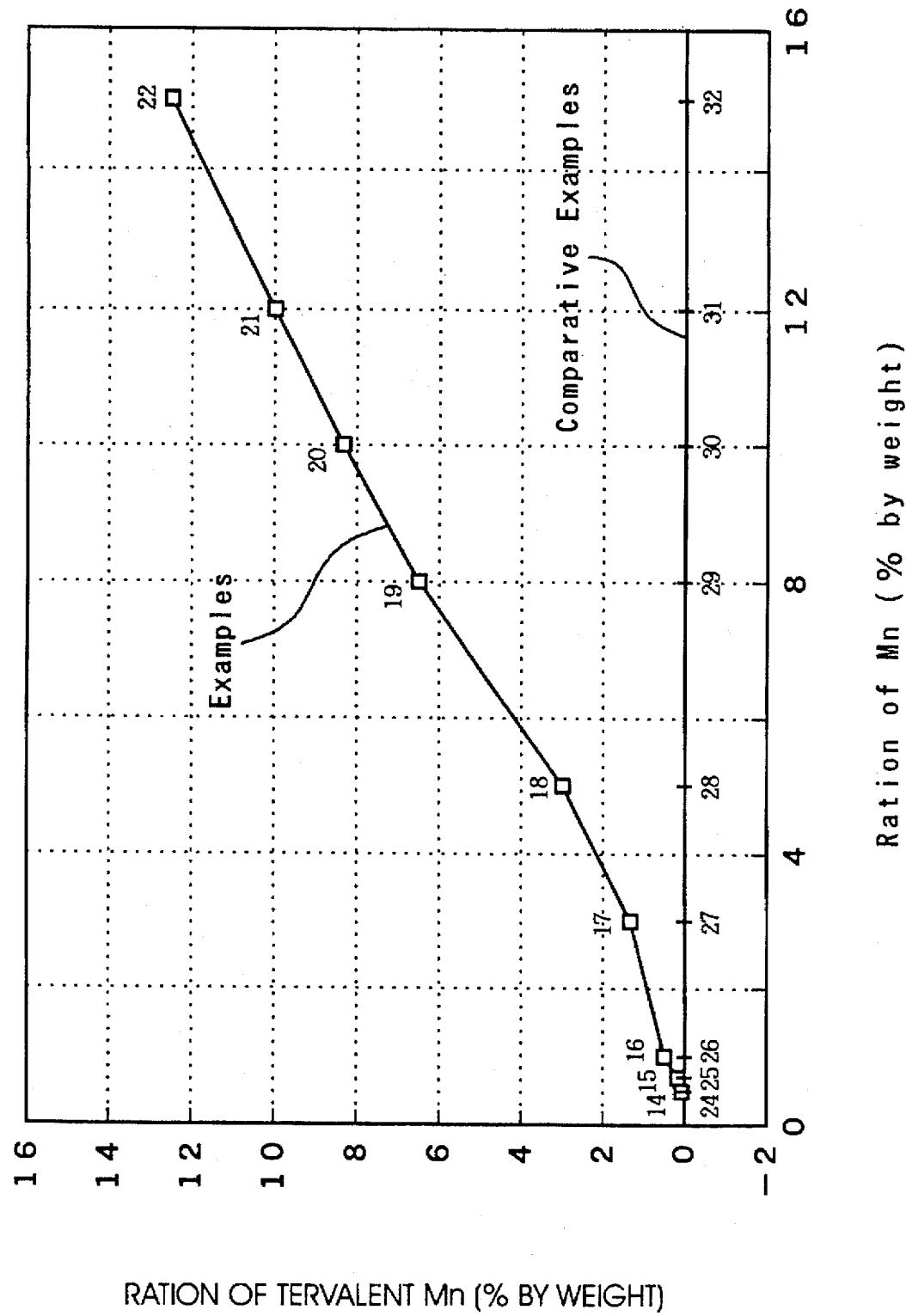
FIG. 8 is a graphical representation of weight ratios of manganese and tervalent manganese added to an active material in Examples 14 through 22 and Comparative Examples 24 through 32.

In these examples, the active materials were prepared by properly varying the weight ratio of nickel sulfate and manganese sulfate, as described above, so as to allow manganese to be added thereto in different amounts such as 0.5% by weight, 0.7% by weight, 1.0% by weight, 3.0% by weight, 5.0% by weight, 8.0% by weight, 10.0% by weight, 12.0% by weight and 15.0% by weight, against the total amount of metals constituting the active material, as shown in Table 3 and FIG. 8 as below.

Next, the weight ratio (% by weight) of tervalent manganese contained in each active material was found, and the results are given in Table 3 and FIG. 8.

To find the weight ratio (% by weight) of tervalent manganese contained in each active material, a given amount of each active material was put into concentrated hydrochloric acid to dissolve bivalent and tervalent manganese therein. The amount of manganese dissolved in the solution was determined by an atomic absorption method, so as to find the total amount of manganese, or the total amount of bivalent and tervalent manganese in the solution. Thereafter, the same amount of each active material as the above was put into concentrated nitric acid to dissolve bivalent manganese therein. The solution with bivalent manganese dissolved therein was filtered so that the amount of bivalent manganese in the resultant filtrate was determined by the atomic absorption method. Thus, the amount of tervalent manganese was found from the difference between the aforesaid total amount of manganese and the amount of bivalent manganese.

TABLE 3

|  | Added amount of Mn (% by weight) | Added amount of tervalent Mn (% by weight) |
|---|---|---|
| Ex. 14 | 0.5 | 0.1 |
| Ex. 15 | 0.7 | 0.2 |
| Ex. 16 | 1.0 | 0.5 |
| Ex. 17 | 3.0 | 1.3 |
| Ex. 18 | 5.0 | 3.0 |
| Ex. 19 | 8.0 | 6.5 |
| Ex. 20 | 10.0 | 8.3 |
| Ex. 21 | 12.0 | 10.0 |
| Ex. 22 | 15.0 | 12.5 |

[Preparation of Electrodes]

In preparation of electrode, pastes were prepared by kneading 90 parts by weight of the above active material, 10 parts by weight of cobalt hydroxide and 20 parts by weight of an aqueous solution of methylcellulose (content: 1% by weight) respectively. The resultant pastes were each filled in a porous body such as formed of a nickel-plated porous metal (porosity: 95%, average pore size: 200 µm). The porous bodies thus filled were dried to be shaped into non-sintered nickel electrodes of Examples 14 through 22.

[Preparation of Cells]

Non-sintered nickel electrode of Examples 14 through 22 were used as the positive electrode of nickel-cadmium storage cells. Similarly to the aforesaid examples, the nickel-cadmium storage cells were prepared by assembling the non-sintered nickel electrode of Examples 14 through 22, a known paste-type cadmium electrode, a nylon nonwoven separator, alkaline electrolyte, a metal cell container, a metal lid and other components. An aqueous solution of 30% by weight of KOH was used as the electrolyte.

COMPARATIVE EXAMPLES 24 THROUGH 32

In these comparative examples, aqueous solutions of nickel sulfate and manganese sulfate were mixed together to prepare an aqueous solution as a mixture of nickel sulfate and manganese sulfate at a suitable weight ratio. In these comparative examples, a 20% by weight of aqueous solution of sodium hydroxide was put into each of the resultant mixed aqueous solutions, and was mixed by stirring at 35° C., pH 11±0.5 thereby to obtain a deposit, as disclosed in Japanese Unexamined Patent Publications No.5-21064 (1993) and No.5-412152 (1993). Then the resultant deposit was filtered, and the residue was washed with water and vacuum-dried to yield active materials comprising nickel hydroxide with manganese added thereto.

In Comparative Examples 24 through 32, similarly to aforesaid Examples 14 through 22, there were prepared active materials with manganese added thereto in different amounts such as 0.5% by weight, 0.7% by weight, 1.0% by weight, 3.0% by weight, 5.0% by weight, 8.0% by weight, 10.0% by weight, 12.0% by weight and 15.0% by weight, against the total amount of metals constituting the active material, as shown in FIG. 8.

Similarly to the above active materials of Examples 14 through 22, the weight ratio of tervalent manganese of the active materials thus prepared was to be found. However, each of the active materials of these comparative examples contained no tervalent manganese as shown in FIG. 8. All the manganese was bivalent as incorporated in a solid solution of nickel hydroxide and no manganese was present as liberated from the solid solution of nickel hydroxide.

In these comparative examples, as well, the aforesaid active materials were used to fabricate nickel-cadmium storage cells in the same manner as the above examples.

[Test Conditions for Cells]

Figure 9:
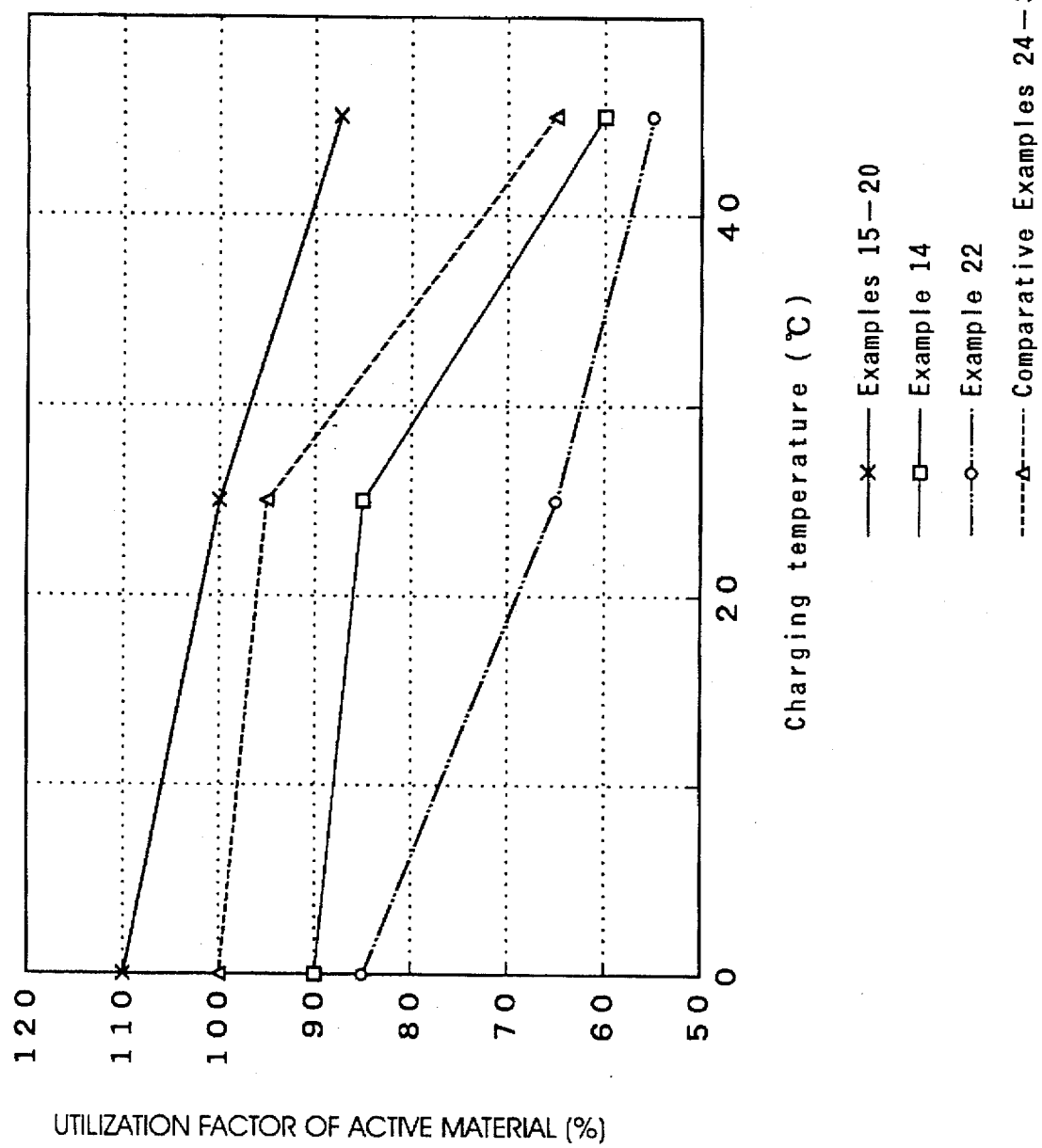
FIG. 9 is a graphical representation of the relationship between the charging temperature of a cell and the utilization factor of an active material in Examples 14 through 22 and Comparative Examples 24 through 32.

Next, the cells of Examples 14 through 22 and Comparative Examples 24 through 32 thus prepared were subject to a cycle test by charging the cells with 0.1 C rate to the depth of 160% at temperatures of 0° C., 25° C. and 40° C. respectively and then by discharging them with 1 C rate (reduction of 1.0 V) at the temperature of 25° C., whereby finding the utilization factor of the respective active materials of the storage cells. Then, the relationship between the charging temperature of the cells and the utilization factor of the active materials was found and the results are given in FIG. 9.

The results indicate that Examples 15 through 21 out of Examples 14 through 22 exhibit much higher utilization factors in a wide range of temperatures as compared with Comparative Examples 24 through 32, which Examples 14 through 22 employ active materials comprising a solid solution of nickel hydroxide incorporating some manganese in combination with the remaining manganese being liberated therefrom, which Examples 15 through 21 employ active materials comprising a solid solution of nickel hydroxide mixed with 0.5% to 2% by weight of manganese in combination with 0.2% to 10% by weight of liberated manganese, with the total amount of these manganese being in the range of from 0.7% to 12% by weight.

Experiment 5

This experiment studied the effect of pH on the preparation process of the active materials of the above examples.

In this experiment, an alkaline aqueous solution as a mixture of aqueous solutions of sodium hydroxide and ammonia was put into an aqueous solution as a mixture of solutions of nickel sulfate and manganese sulfate; the pH was adjusted at 9, 10, 10.5, 11, 11.5, 12 and 12.5 during the process for producing the deposit. Thus were prepared active materials comprising a solid solution of nickel hydroxide mixed with 1% by weight of manganese in combination with 4% by weight of liberated manganese, the total amount of which manganese against the total amount of metal of the active material was 5% by weight.

Figure 10:
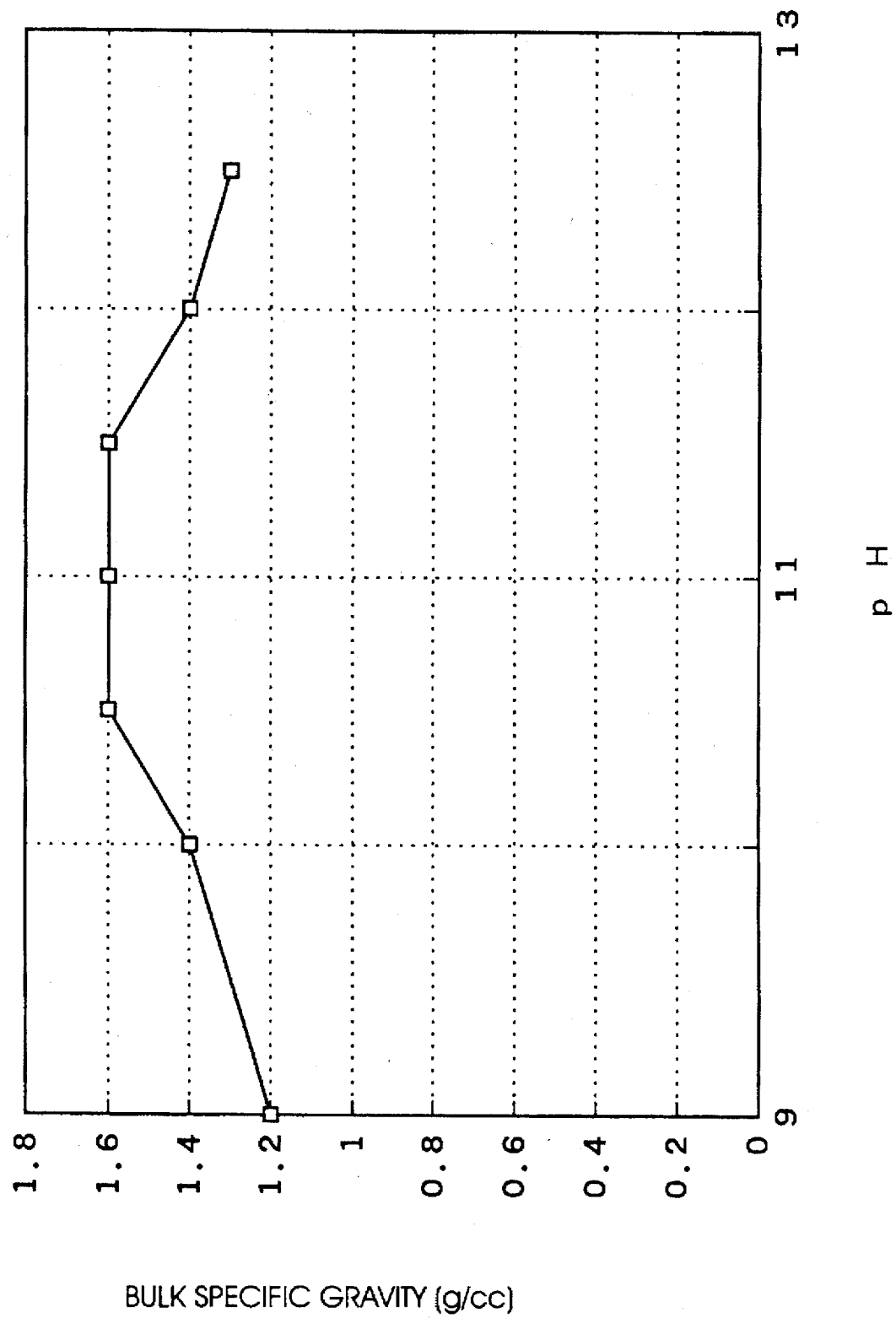
FIG. 10 is a graphical representation of the relationship between the pH during deposition of an active material and the bulk specific gravity of a resultant active material in Example 5.

Next, the bulk specific gravity of the resultant active materials was measured and the results are given in FIG. 10, wherein the pH is plotted as abscissa and the bulk specific gravity (g/cc) as ordinate. The bulk specific gravity was measured by the use of an apparatus specified by JIS-K-5101.

It was found from the results that if the pH during the preparation of the active material is set in the range of 11±0.5, the resultant active material has a relatively high bulk specific gravity and good chargeability.

EXAMPLES 23 THROUGH 36

In these examples, active materials were prepared in the same manner as the above examples except that aqueous solutions of nickel sulfate and manganese sulfate used in aforesaid Examples 14 through 22 were mixed with any of solutions of cadmium sulfate, zinc sulfate, cobalt sulfate, calcium nitrate, magnesium sulfate and barium nitrate as properly combined. Thus were obtained active materials comprising nickel hydroxide with manganese added thereto, which nickel hydroxide further incorporated one or more elements selected from a group consisting of cobalt, zinc, cadmium, calcium, magnesium and barium, as shown in Table 4 as below. These active materials were used to fabricate nickel-cadmium cells in the same manner as the aforesaid examples.

These cells were subject to a cycle test by charging the cells with 0.1 C rate to the depth of 160% at 25° C. and then by discharging them with 1 C rate (reduction of 1.0 V) at 25° C. Then the utilization factor of the respective active materials was found and the results are given in Table 4.

TABLE 4

| | Active material Components (% by weight) | | | | | | | | U.factor |
|---|---|---|---|---|---|---|---|---|---|
| | Ni | Mn | Co | Zn | Cd | Ca | Mg | Ba | (%) |
| Ex. 23 | 95 | 5 | | | | | | | 87 |
| Ex. 24 | 94.5 | 5 | 0.5 | | | | | | 89 |
| Ex. 25 | 94.5 | 5 | | 0.5 | | | | | 89 |
| Ex. 26 | 94.5 | 5 | | | 0.5 | | | | 89 |
| Ex. 27 | 94.5 | 5 | | | | 0.5 | | | 89 |
| Ex. 28 | 94.5 | 5 | | | | | 0.5 | | 89 |
| Ex. 29 | 94.5 | 5 | | | | | | 0.5 | 89 |
| Ex. 30 | 94 | 5 | 0.5 | 0.5 | | | | | 89 |
| Ex. 31 | 94 | 5 | 0.5 | | 0.5 | | | | 90 |
| Ex. 32 | 94 | 5 | | | | | 0.5 | 0.5 | 90 |
| Ex. 33 | 93.5 | 5 | 0.5 | 0.5 | | 0.5 | | | 90 |
| Ex. 34 | 93.5 | 5 | | 0.5 | | 0.5 | 0.5 | | 90 |
| Ex. 35 | 93.5 | 5 | | | 0.5 | 0.5 | 0.5 | | 91 |
| Ex. 36 | 93.5 | 5 | | 0.5 | 0.5 | | | 0.5 | 91 |

As apparent from the results of these examples, if, additionally to manganese, one or more elements selected from the group consisting of cobalt, zinc, cadmium, calcium, magnesium and barium are added to an active material essentially consisting of nickel hydroxide, the resultant active material has a further increased utilization factor at high temperatures.

What is claimed is:

1. A non-sintered nickel electrode for use in alkaline storage cells comprising an active material including a solid solution of nickel hydroxide mixed with manganese and zinc, the solid solution further incorporating one or more elements selected from a group consisting of cobalt, cadmium, calcium and magnesium.

2. A non-sintered nickel electrode for use in alkaline storage cells as set forth in claim 1, wherein the active material incorporates 0.1% to 10.0% by weight of manganese for formation of the solid solution.

3. A non-sintered nickel electrode for use in alkaline storage cells as set forth in claim 1, wherein the active material incorporates 0.1% to 10.0% by weight of manganese and 0.5% to 5.0% by weight of zinc for formation of the solid solution.

4. A non-sintered nickel electrode for use in alkaline storage cells as set forth in claim 1, wherein the active material incorporates 0.1% to 5.0% of one or more elements selected from the group consisting of cobalt, cadmium, calcium and magnesium for formation of the solid solution.

5. A non-sintered nickel electrode for use in alkaline storage cells as set forth in claim 3, wherein the active material incorporates 0.1% to 5.0% by weight of one or more elements selected from the group consisting of cobalt, cadmium, calcium and magnesium for formation of the solid solution.

6. A non-sintered nickel electrode for use in alkaline storage cells comprising an active material including nickel hydroxide mixed with manganese, some of which manganese is incorporated in a solid solution of nickel hydroxide and the rest of which manganese is not in the solid solution of nickel hydroxide.

7. A non-sintered nickel electrode for use in alkaline storage cells as set forth in claim 6, wherein the amount of the manganese incorporated in the solid solution is in the range of from 0.5% to 2% by weight against the total weight of metal, and the amount of the liberated manganese is in the range of from 0.2% to 10% by weight against the total weight of the metal.

8. A non-sintered nickel electrode for use in alkaline storage cells as set forth in claim 6, wherein the active material is obtained by putting a mixed solution of ammonia and sodium hydroxide into an aqueous solution as a mixture of nickel salt and manganese salt, and maintaining the resultant mixture solution at pH 11±0.5.

9. An active material included in a non-sintered nickel electrode for use in alkaline storage cells as set forth in claim 6, wherein a solid solution of nickel hydroxide mixed with manganese further incorporates one or more elements selected from a group consisting of cobalt, zinc, cadmium, calcium and magnesium.

10. An active material included in a non-sintered nickel electrode for use in alkaline storage cells as set forth in claim 9, wherein a solid solution of nickel hydroxide mixed with manganese and zinc further incorporates one or more elements selected from a group consisting of cobalt, cadmium, calcium and magnesium.

* * * * *